Oct. 24, 1961    G. A. DECKER    3,005,267
SIMULATED AIRCRAFT FIRE SYSTEM
Original Filed Oct. 3, 1956
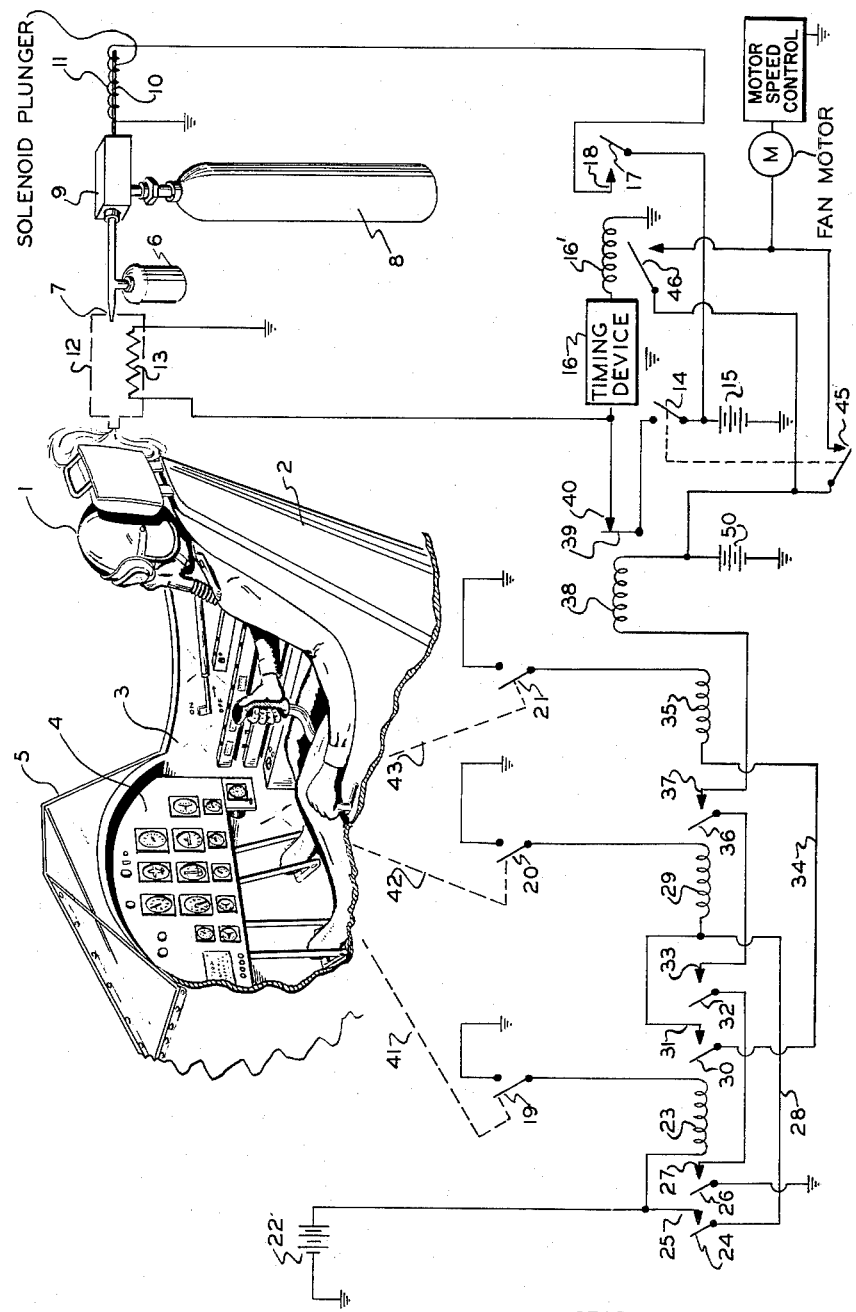
GEORGE A. DECKER
INVENTOR
BY Darby & Darby
ATTORNEYS

United States Patent Office 3,005,267
Patented Oct. 24, 1961

3,005,267
SIMULATED AIRCRAFT FIRE SYSTEM
George A. Decker, Binghamton, N.Y., assignor to General Precision, Inc., Wilmington, Del., a corporation of Delaware
Continuation of application Ser. No. 613,749, Oct. 3, 1956. This application Feb. 13, 1959, Ser. No. 793,217
13 Claims. (Cl. 35—12)

This invention relates to improved apparatus for use in grounded aircraft trainers and more particularly to the simulation of aircraft fires and the training of pilots in fire-fighting technique.

This application is a continuation of my copending application Serial No. 613,749, filed October 3, 1956, now abandoned.

Realistic presentation of flight conditions consistent with complete safety to the student is readily recognized as very valuable in the training of pilots. To approach closely to realism in the representation of a matter as perilous as an aircraft fire without danger to the student is, of course, particularly difficult. Very often the first indication the pilot receives of an actual fire on board, other than a fire in the engine compartment, is from smoke and fumes seeping into the cockpit. In accordance with the invention, artificial smoke of a harmless nature and devoid of noxious fumes is introduced into the cockpit of the grounded trainer by action of the instructor without warning to the student. The smoke enters the cockpit from an opening behind the pilot's seat. Preferably a dense white smoke effect is employed. The student must then immediately carry out specified fire-fighting measures by means of controls at his disposal located on the instrument board of the trainer. As soon as these emergency measures have been taken the student will proceed to "dump cabin pressure," that is, he will change his dummy cabin pressure switch from the "cabin pressure" position to the "ram air" position. This operation is for the purpose of forcing air from outside through the cockpit to clear out most of the smoke. In the simulator, this operation or any operation which has been established as the final step of the fire-fighting procedure, serves to shut down the production of the artificial smoke. In the trainer, when the student has thrown the cabin pressure switch the conventional cockpit air conditioning system commonly provided in grounded trainers will clear the cockpit of the simulated smoke. Interlocking control circuits are provided so that the smoke generator can not be shut off by action of the student until he has first carried out each step of the normal fire fighting procedure.

Operation of the instructor's "Aircraft Fire" switch energizes an electrical heater unit and starts a timing device. After a few seconds of pre-heating the timer energizes a solenoid valve, permitting compressed air to flow to a small spray gun that is filled with a suitable fluid for simulating smoke. A suitable liquid for the purpose is one known in the trade as "Life-Like," used on model railroads. I have found that paraffin-base liquids are particularly suitable. It is essential, of course, that nontoxic fumes be created. It is also desirable that the simulated smoke not cling to interior portions of the cockpit, and for this reason, one should insure that ample heat is provided to burn all of the atomized liquid as thoroughly as possible. If considerable heat is applied to the atomized liquid, the sudden warming of the air in the trainer cockpit simultaneously with the entry of smoke will serve further to increase the realism of the simulated fire.

The liquid is atomized by the spray gun and blown across the heater unit, producing the desired dense white smoke. When the student pilot switches to "ram air," simulated cabin pressure indication becomes dependent upon airspeed and aircraft altitude. This dependence is simulated and the reading of the cabin pressure indicator presented to the pilot is changed accordingly.

An object of the invention is the safe training of pilots in fire-fighting procedure under simulated flight conditions.

Another object is to increase the realism of the simulation of aircraft fire.

Other objects of the invention will in part be obvious and will in part appear hereinafter.

The invention accordingly comprises the features of construction, combination of elements, and arrangement of parts, which will be exemplified in the construction hereinafter set forth, and the scope of the invention will be indicated in the claims.

For a fuller understanding of the nature and objects of the invention reference should be had to the following detailed description taken in connection with the accompanying drawing, in which:

The single figure of the drawing is a schematic diagram of a system embodying the invention together with a perspective view of a portion of the cockpit showing the relationship of the student to the instruments, the controls and the smoke-simulating apparatus.

In the single figure of the drawing, there is shown a student 1 in the seat 2 of a simulated aircraft cockpit 3, before an instrument panel 4 and a windshield 5. Back of the seat 2 is mounted a spray gun 6 with a nozzle 7, the spray gun containing a supply of a suitable fluid for simulating smoke, such as the liquid known in the trade as "Life-Like," used on model railroads. Pressure means for operating the spray gun is provided in the form of a cylinder 8 of compressed air or other suitable gas, connected through a valve device 9 to the spray gun 6 and nozzle 7. The valve device 9 is provided with suitable operating means, such as a solenoid plunger 10 and energizing winding 11 therefor. The nozzle 7 is arranged in proximity to an electrical heater 12 containing a heating winding 13. The valve device 9 and heater 12 are provided with control means comprising an instructor's "Aircraft Fire" switch 14 through which current from a suitable source, shown as a battery 15 may be supplied to the heating winding 13 and to a relay winding 16' for operating normally open contacts 17 and 18 through which a circuit may be completed through solenoidal winding 11. Pre-heating of the heater 12 before opening of the valve device 9 is provided by inserting a timing device 16 before the relay 16' or by making the relay 16' sufficiently slow acting.

Within reach of the student in the cockpit there are provided a plurality of manually operable devices to be operated by the student when smoke enters the cockpit simulating an aircraft fire. The student is instructed to follow certain prescribed fire-fighting procedures which require that certain of the manually operable devices be operated in a prescribed order. When the last of the devices has been operated in the proper order, the smoke-generating means is automatically shut down.

In the drawing, three manually operable switches 19, 20 and 21 are shown which are normally open and which the student is required to cause to be closed by operating the requisite manual controls in numerical order in accordance with the fire-fighting procedure. The switches are coupled to the cockpit controls as indicated schematically by broken lines 41, 42 and 43 respectively, in any desired manner. Closure of switch 19 completes an operating circuit from ground through a battery 22, a relay winding 23, and switch 19 to ground. Relay winding 23 is operatively associated with two normally open contact pairs 24, 25 and 26, 27. Closure of contact pair 24, 25 through operation of relay 23 serves to extend the circuit of battery 22 over a lead 28 to one end of a relay winding 29 which winding is connected at its other end to the switch 20. Closure of contact pair 26, 27 begins the preparation of a serial circuit from ground, for the ultimate purpose of shutting down the smoke generator.

Closure of switch 20 operates relay 29, closing normally open contact pairs 30, 31 and 32, 33. Operation of relay 29 extends the battery circuit through contacts 31, 30 and a lead 34 to one end of a relay winding 35 which winding is in turn connected to the switch 21. Closure of contact pair 32, 33 extends the above-mentioned serial circuit from ground.

Closure of switch 21 operates relay 35, closing normally open contact pair 36, 37, thereby completing the serial circuit from ground through the now closed contacts 26, 27, 32, 33, 36, and 37, and through a relay winding 38 and a battery 50 to ground, and operating the relay 38. Operation of relay 38 opens a normally closed contact pair 39, 40 in serial relationship with the instructor's switch 14, thereby interrupting the operating circuits of both the heating winding 13 and the relay 16 and shutting down the smoke generator. Thus relay 38 and its contacts 39—40 may be viewed in one sense as a means for stopping the smoke generator, and relays 23, 29, and 35 and their respective contacts 26—27, 32—33, and 36—37 may be viewed in one sense as a means controlling the stopping means.

Grounded flight trainers commonly are provided with air conditioning systems to remove the heat generated by electrical apparatus, and to allow students to wear flying suits and similar paraphernalia while "flying" the trainer, which may be located in a warm room. Such an air conditioning unit commonly is provided with a fan to change the air in the cockpit. If desired, a further switch contact 45 may be provided for interrupting the circuit to the air conditioning fan when the instructor's "Aircraft Fire" control switch is operated. Stopping the fan when smoke is blown into the cockpit serves to insure that the smoke will pervade thoroughly within the cockpit and will not merely travel in a directed stream to be expelled from the cockpit by the fan. The additional switch mentioned may be shunted by a further contact 46 operated by relay 38, thereby resuming operation of the fan when correct fire-fighting procedure has been conducted. Alternatively, the low circuit interrupting switch may be shunted by a further contact on the student's dummy cabin pressure switch to restore power to the air conditioning unit fan upon positioning of such switch to the "ram air" position. If desired, the further contact on the student's dummy cabin pressure switch may be connected to operate the fan at a greater than normal velocity while positioned to "ram air" position.

The operation of the system illustrated will be evident from the foregoing description of the apparatus employed. The instructor may at any time without any warning to the student, close the "Aircraft Fire" switch 14, whereupon the spray gun 6 is actuated to blow atomized smoke-simulating material over the also actuated heater 12 into the cockpit from behind the student. The entrance of the smoke gives the student a very realistic sense of the occurrence of an aircraft fire and the immediate necessity of carrying out the prescribed fire-fighting procedure. He thereupon opens the simulated ignition switch, and in general performs in the proper order all the various manual operations required by the fire-fighting procedure. In so doing, the student operates all the necessary controls required to insure the closure of the switches 19, 20, and 21 in numerical order whereupon the smoke generator is shut down. There may of course be any desired number of switches employed instead of only three as illustrated and it will be understood that the necessary number of additional relays may be added to the relay train 23, 29, 35, in an obvious extension of the control circuit shown. Generally the last step in the fire-fighting procedure will be to change the cabin pressure switch from the "cabin pressure" position to the "ram air" position, which action in actual flight results in the forcing of air from outside through the cockpit to clear out the smoke. Cabin pressure then becomes dependent upon airspeed and aircraft altitude. Although the above disclosure has indicated a means for utilizing the fan motor of a conventional air conditioner used in grounded trainers for the additional function of providing "ram air," a second fan motor may be used for that purpose. Alternatively, the fan motor may be of a type with two speeds of operation with the faster being used to provide ram air. In real aircraft the pressure of "ram air" is dependent upon airspeed and aircraft altitude. This dependence may be simulated in the trainer in well known manner by appropriate interconnections in the computing section of the trainer, so that the reading of the simulated cabin pressure indicator presented to the pilot is controlled by the computed airspeed and aircraft altitude. Also, the speed of the fan motor when operating to provide "ram air" may be modified in accordance with these quantities.

It will thus be seen that the objects set forth above, among those made apparent from the preceding description, are efficiently attained, and since certain changes may be made in the above construction without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. Smoke generator for grounded aircraft trainer apparatus to simulate aircraft fire employing a suitable liquid substance, comprising a time delay device, electrical heating means, an instructor's switch for energizing the said heating means and starting the time delay device, atomizing means actuated by the time delay device upon expiration of a delay period to atomize said liquid, and means to direct the atomized material past the said heating means to the trainee's location in the form of smoke.

2. Grounded aircraft trainer apparatus for fire fighting training, comprising a starting switch controlled by the instructor, a smoke generator actuated upon closing of the starting switch for introducing simulated smoke into the trainee's cockpit, means controlled by said starting switch for altering the flow of air through the trainee's cockpit, a plurality of controls to be operated by the trainee in accordance with an established fire-fighting procedure, stopping means for said smoke generator, and control means responsive to the correct operation of said plurality of controls for actuating said stopping means.

3. In grounded aircraft trainer apparatus, artificial smoke producing means, separate starting and stopping means therefor, means for providing a flow of air past a trainee's station, relay means for actuating said stopping means, a plurality of contacts serially related one to another and to said relay means, means for closing said serial contacts in predetermined order, whereby said relay means is operated to stop said smoke producing means upon completion of the circuit through said serial contacts, said means for providing a flow of air being operated in synchronism with said starting and stopping means.

4. In grounded aircraft trainer apparatus, means for establishing a normal flow of air past a trainee's station, a smoke generator employing a suitable liquid substance for simulating aircraft fire, a timing device, electrical heating means, an instructor's switch for energizing the heating means and starting the timing device, means including a supply of air under pressure actuated by the timing device to atomize said liquid and direct the atomized material over the heating means to the trainee's position in the form of smoke, a plurality of controls to be operated by the trainee in carrying out a prescribed fire-fighting procedure, stopping means for said smoke generator, and a train of relays responsive to the operation of said controls for actuating said stopping means, said stopping means being operative to re-establish said normal flow of air past said trainee's station.

5. Grounded aircraft trainer apparatus for fire-fighting training comprising a starting switch controlled by the instructor, a smoke generator actuated on closing the starting switch for introducing simulated smoke into the trainee's cockpit, a plurality of controls to be operated by the trainee in accordance with an established fire-fighting procedure, stopping means for said smoke generator, control means responsive to the correct operation of said plurality of controls for actuating said stopping means, and means responsive to said control means for providing high velocity air to clear said simulated smoke from the trainee's cockpit.

6. In grounded aircraft trainer apparatus, artificial smoke producing means, separate starting and stopping means therefor, relay means for actuating said stopping means, a plurality of contacts serially related one to another and to said relay means, means for closing said serial contacts in predetermined order, whereby said relay means is operated to stop said smoke producing means upon completion of the circuit through said serial contacts, and means responsive to said relay means for providing high velocity air through said cockpit to clear out said simulated smoke.

7. Grounded aircraft trainer apparatus for fire-fighting training, comprising a starting switch controlled by the instructor, a smoke generator actuated upon closing of the starting switch for introducing simulated smoke into the trainee's cockpit, a plurality of controls to be operated by the trainee in accordance with an established fire-fighting procedure, stopping means for said smoke generator, control means responsive to said plurality of controls for actuating said stopping means, and means responsive to proper operation of said plurality of controls to provide high velocity air to clear said smoke from said cockpit.

8. In grounded trainer apparatus having a trainee's station within an enclosed cockpit and an air-conditioning system including a fan for establishing normal flow of air at said trainee's station, the combination of switch means controllable by an instructor, smoke generator apparatus actuated by said switch means for introducing simulated smoke into said cockpit, control means responsive to correct operation of a plurality of controls by said student to stop operation of said smoke generator apparatus, said switch means and said control means being connected to said fan to affect said normal flow of air during operation of said smoke generator apparatus.

9. Apparatus according to claim 8 in which said smoke generator apparatus comprises a heating element and means for applying an atomized spray of paraffin-base liquid to said heating element.

10. Apparatus according to claim 8 having dummy control means included in said control means and operable by said student to affect said flow of air in simulation of an actual aircraft control for admitting ram air to an aircraft cockpit.

11. Apparatus according to claim 9 having time-delay switching means connected to be operated by said switch means, said heating element being energized immediately upon operation of said switch means, and said means for applying said atomized spray being operated by said time delay means after a delay period suitable to allow heating of said heating element.

12. Apparatus according to claim 10 in which said dummy control means affects the speed of operation of said fan.

13. Apparatus according to claim 12 in which the speed of said fan during simulated ram air conditions is controlled in accordance with factors of simulated aircraft airspeed and simulated aircraft altitude.

References Cited in the file of this patent

UNITED STATES PATENTS

| | | |
|---|---|---|
| 1,789,680 | Gwinnett | Jan. 20, 1931 |
| 2,088,264 | Heinis | July 27, 1937 |
| 2,338,762 | Groth et al. | Jan. 11, 1944 |
| 2,408,429 | Levey | Oct. 1, 1946 |
| 2,552,979 | Kucher | May 15, 1951 |
| 2,610,437 | Smith | Sept. 16, 1952 |